No. 843,460. PATENTED FEB. 5, 1907.
H. R. HURST.
COTTON CHOPPER.
APPLICATION FILED JULY 21, 1906.
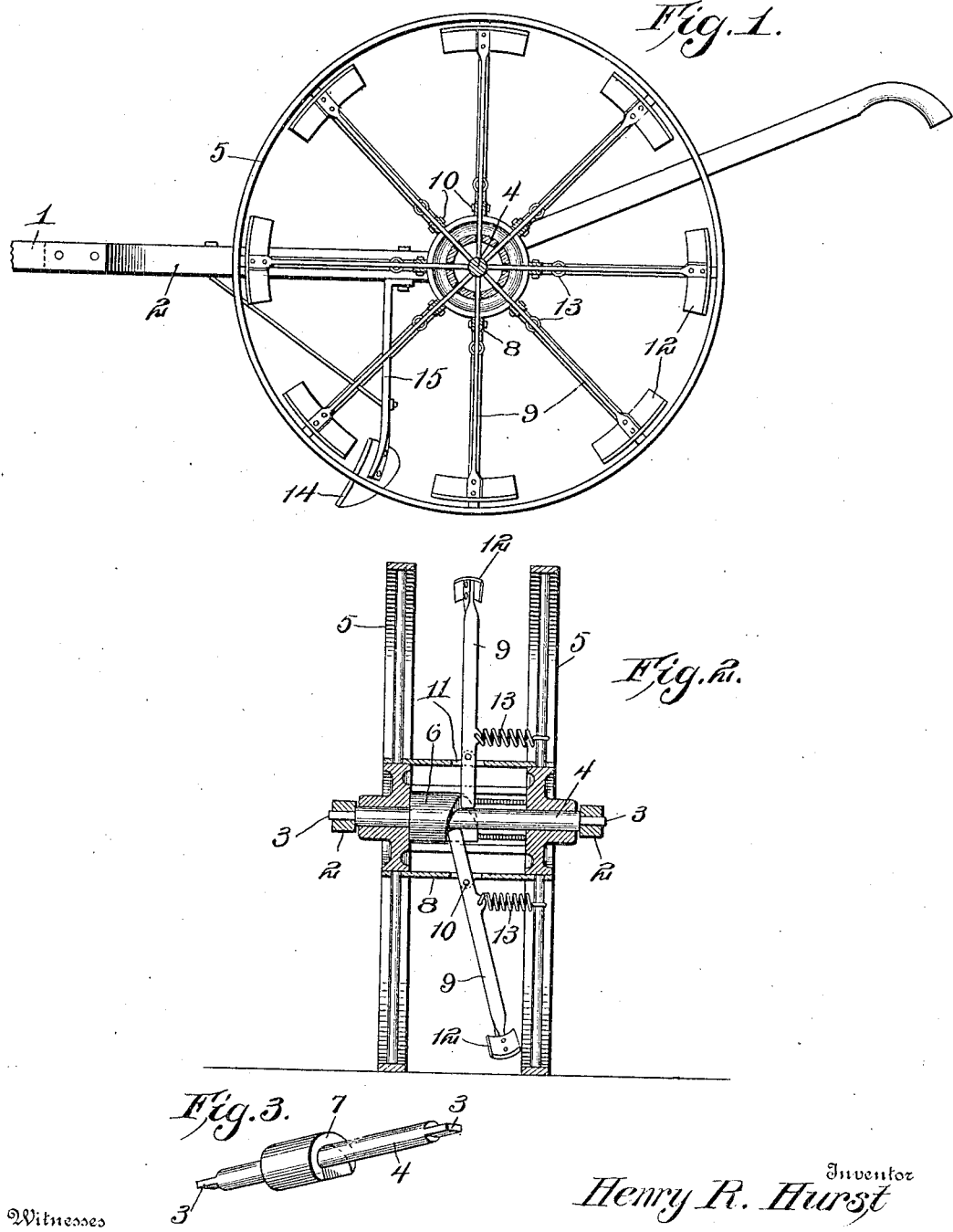
Inventor
Henry R. Hurst
By Victor J. Evans.
Attorney
Witnesses

UNITED STATES PATENT OFFICE.

HENRY R. HURST, OF CAIRO, GEORGIA.

COTTON-CHOPPER.

No. 843,460.

Specification of Letters Patent.

Patented Feb. 5, 1907.

Application filed July 21, 1906. Serial No. 327,183.

*To all whom it may concern:*

Be it known that I, HENRY R. HURST, a citizen of the United States, residing at Cairo, in the county of Grady and State of Georgia, have invented new and useful Improvements in Cotton-Choppers, of which the following is a specification.

This invention relates to cotton-choppers, the object of the invention being to provide a simple, effective, and reliable cotton-chopper which embodies a main frame and supporting-wheels and is adapted to straddle one row at a time and gradually thin out the cotton as the machine moves lengthwise of said row, the machine embodying a plurality of chopping-blades in connection with mechanism for moving said blades to one side of the row and quickly throwing them across the row, so as to remove superfluous plants without injuring the remaining plants.

With the above general object in view the invention consists in the novel construction, combination, and arrangement of parts hereinafter more fully described, illustrated, and claimed.

In the accompanying drawings, Figure 1 is a sectional side elevation of a cotton-chopper embodying the present invention. Fig. 2 is a central vertical cross-section through the same. Fig. 3 is a detail perspective view of the axle which also constitutes the cam-shaft.

The frame of the cotton-chopper contemplated in this invention comprises, essentially, a draft pole or tongue 1 and a fork extending rearward therefrom and embodying the oppositely-located arms 2, in which are received the opposite reduced ends 3 of a stationary axle 4, which constitutes also the cam-shaft of the machine, as hereinafter set forth.

Mounted upon the stationary axle 4, between the arms 2, are two carrying-wheels 5, while mounted fast upon said stationary axle 4 is a cam 6, the inner edge of which is cut away on a spiral, as shown at 7. The opposite ends of the axle 4 are preferably reduced in such manner as to leave elongated flat shanks, as shown in Fig. 3, which are received in corresponding sockets in the arms 2 of the frame, whereby said axle is prevented from turning.

Connecting the wheels 5 and encircling the cam 6 is a cylindrical drum 8, and pivotally connected to said drum is a circular series of chopper-arms 9, each being pivotally mounted at 10 on the drum, the inner ends of said arms projecting through openings 11 in the drum and working in contact with the spiral edge of the cam 6, as clearly shown in Fig. 2. Each of the chopper-arms 9 has rigidly secured to its outer extremity a curved chopping-blade 12, which operates close to the ground, said blade being adapted to swing back and forth laterally between the wheels 5, as indicated in Fig. 2. Between the fulcrum-point 10 and the chopping-blade 12 each arm 9 has connected thereto one end of a throw-spring 13, the opposite end of which spring is connected to one of the wheels 5, as shown in Fig. 2, and the tension of said spring being exerted to throw the arm 9 and the chopper-blade 12, carried thereby, quickly from one side to the other.

Arranged close to the wheels at opposite sides of the row are cultivating and weed-removing shovels 14, mounted on the lower ends of a pair of standards 15, connected at their upper ends to the machine-frame. Said shovels serve to loosen the earth adjacent to the plants, at either side of the same, and also to turn weeds and the like out of the way just prior to the action of the chopping-blades.

As the machine is drawn lengthwise of the row, with the wheels 5 at opposite sides of the plants, the drum 8 and the chopping-blades are carried around with the wheels, and the stationary cam 6 acts on said arms to swing the chopping-blades to one side. As the end of the cam passes out of engagement with each chopping-arm said arm is released suddenly and is quickly thrown to the opposite side by the spring 13 connected therewith. In this manner the chopping-blade is swept quickly across the row of plants, removing the proper proportion of the plants without disturbing or dragging down the remaining plants. The remaining cotton-plants are thus left standing in perfect condition.

I claim—

1. A cotton-chopper embodying a frame, carrying-wheels therefor, a stationary cam, and chopping-blades carried around by the wheels and operated upon by said cam to move said chopping-blades laterally, substantially as and for the purpose described.

2. A cotton-chopper embodying a frame, carrying-wheels therefor, a stationary frame, chopper-arms carrying blades and pivotally connected with and carried by said wheels and operated upon by the cam, the latter acting to swing the chopper-arms and move the blades transversely of the direction of movement of the machine.

3. A cotton-chopper embodying a frame, carrying-wheels therefor, a stationary axle, a cam fast thereon, a drum carried by said wheels and revolving therewith, and a plurality of choppers fulcrumed on said drum and coöperating with said cam which acts to throw the choppers from one side to the other, substantially as described.

4. A cotton-chopper embodying a frame, carrying-wheels therefor, a drum connecting said wheels and turning therewith, a stationary axle, a cam fast on said axle, chopper-arms fulcrumed on the drum and extending within the same to coöperate with the cam, springs for throwing the chopper-arms in a reverse direction to that in which they are thrown by the cam, and chopping-blades carried by said chopper-arms.

5. A cotton-chopper embodying a frame, carrying-wheels therefor, a stationary cam, choppers carried by the wheels and operated upon by said cam to swing transversely of the path of movement of the machine, and shovels connected with the frame and operating in advance of the choppers at opposite sides of the row of plants, substantially as described.

In testimony whereof I affix my signature in presence of two witnesses.

HENRY R. HURST.

Witnesses:
J. H. CONNELL,
O. T. DAVIS.